No. 882,646.  
PATENTED MAR. 24, 1908.  
W. E. MURRAY.  
MACHINE FOR MAKING CHOCOLATE.  
APPLICATION FILED JUNE 21, 1907.

2 SHEETS—SHEET 1.

Witnesses:  
Inventor:  
Wycliffe Eustace Murray  
by his attorney

No. 882,646.
PATENTED MAR. 24, 1908.
W. E. MURRAY.
MACHINE FOR MAKING CHOCOLATE.
APPLICATION FILED JUNE 21, 1907.
2 SHEETS—SHEET 2.
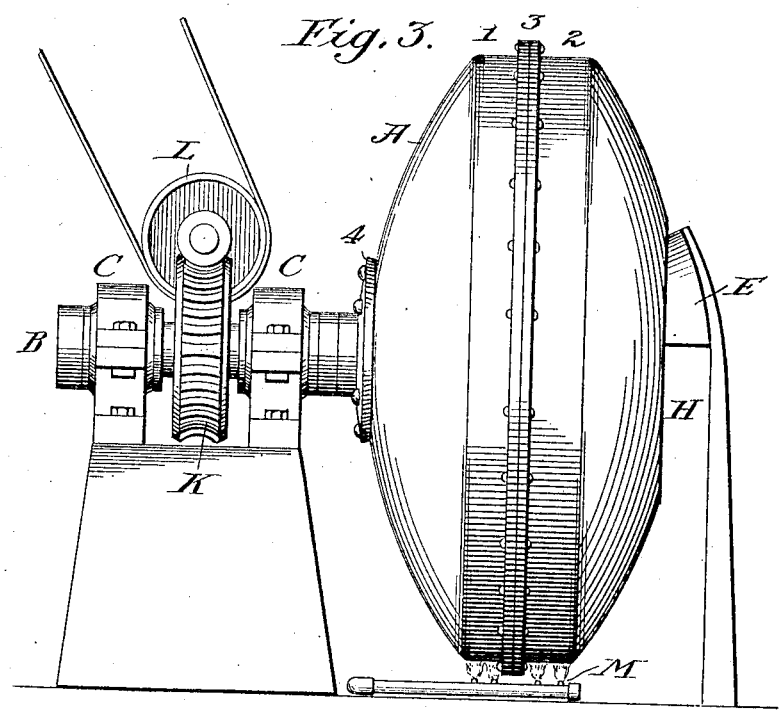
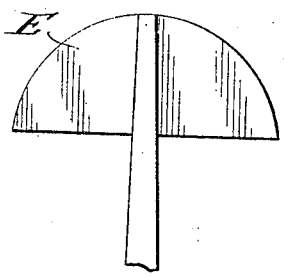
Witnesses:
Inventor:
Wycliffe Eustace Murray
by his attorney

UNITED STATES PATENT OFFICE.

WYCLIFFE EUSTACE MURRAY, OF LONDON, ENGLAND.

MACHINE FOR MAKING CHOCOLATE.

No. 882,646.  Specification of Letters Patent.  Patented March 24, 1908.

Application filed June 21, 1907. Serial No. 380,107.

*To all whom it may concern:*

Be it known that I, WYCLIFFE EUSTACE MURRAY, a subject of the King of Great Britain and Ireland, and a resident of London, in England, have invented a new and useful Improvement in Machines for Making Chocolate, of which the following is a specification.

The present invention consists in certain novel combinations of parts constituting a machine or mill of the ball and drum type especially designed and adapted for grinding or crushing cocoa beans, mixing other substances therewith and preparing the same for the production of chocolate.

The leading object of the invention is to utilize the known advantages of the ball and drum type of mill in a machine adapted for making chocolate by a continuous process.

Other objects are to provide for making the drum with an open front so as to facilitate feeding the machine and to provide for the free escape of the gases generated during the crushing operation and for inspecting the contents throughout the process; to prevent the accidental escape of particles of the chocolate through the open front of the drum while it is in motion; and to facilitate drawing off the liquid product when the process is completed.

Two sheets of drawings accompany this specification as part thereof.

Figure 1:
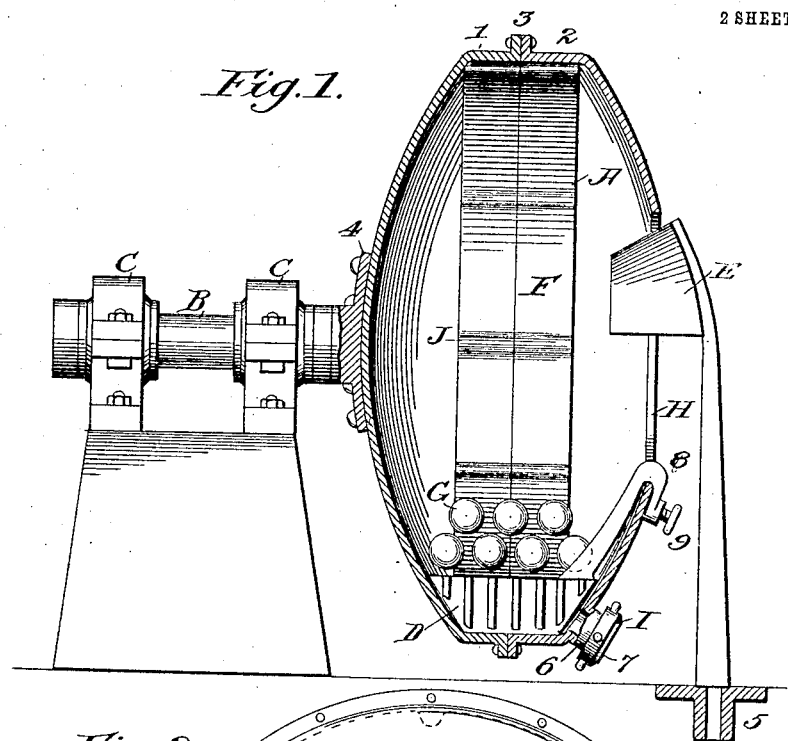
Figure 2:
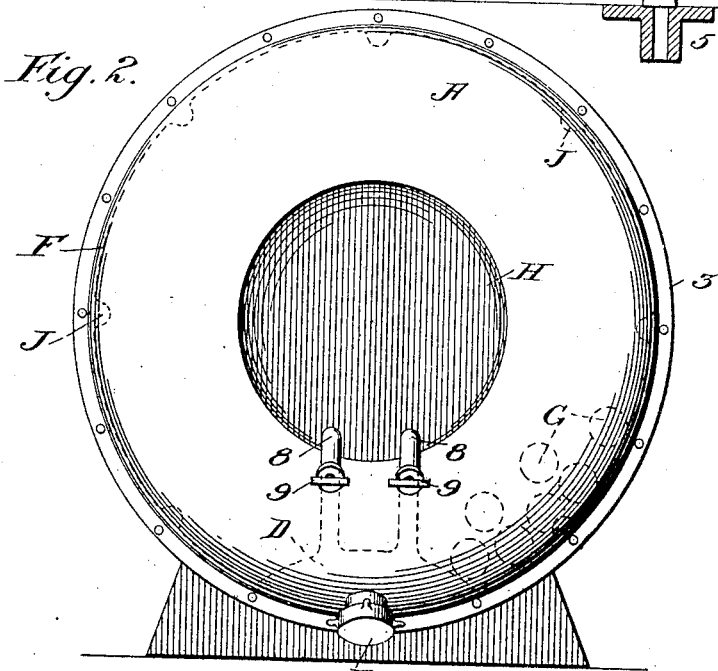

Figure 1 is a sectional elevation of the machine with its front guard and outlet guard in position; Fig. 2 is a front view of the machine and its outlet guard; Fig. 3 is a side view showing the front guard and other accessories; and Fig. 4 is a front view of the upper end of the front guard.

Like reference characters refer to like parts in all the figures.

The drum, A, is constructed of suitable metal and is rigidly attached to one end of a horizontal shaft, B, mounted in suitable bearings, C, and driven by worm gearing, K, L, Fig. 3, or by pinion and spur wheel, to rotate the drum without obstructing its opposite side or front, which is provided with a concentric circular opening, H, for the purposes hereinbefore stated. The drum A is of an oval shape in side view as seen in Figs. 1 and 3 and round in front view as seen in Fig. 2, but its particular shape is not considered essential, as it may be found desirable to make the drum round or square in section. It is conveniently made in two parts, 1 and 2, fixedly united with each other by a circumferential rivet joint, 3, and is riveted to a concentric flange, 4, on the shaft B to rigidly attach the drum as aforesaid. Internally, the drum A is constructed with a crushing surface, F, within its perimeter, preferably crossed at intervals by inwardly projecting ribs, J, and is furnished with the customary equipment of round shot or balls, G, of suitable metal or granite, to interact with said crushing surface and ribs, for the reduction of the cocoa beans to an impalpable paste.

The cocoa beans and other substances to be mixed therewith are fed through the front opening H, as required. To prevent the accidental escape of particles of the chocolate through the front opening H when the drum is in motion a front guard, E, is provided, which projects into the upper part of the opening H, and is supported by a stationary step, 5, Fig. 1, external to the drum. This guard is so constructed that any particles falling thereon are thrown back into the drum. The drum can be heated to any required extent by suitable external means, such as gas jets, M, Fig. 3, underneath the drum.

After the cocoa beans have been reduced to chocolate suitable for confectionery and beverage purposes, either or both, the liquid product is drawn off through a normally closed outlet, I, which is suitably located with reference to the grinding surface F at the front of the drum and is composed of a nozzle, 6, and tight cap, 7, Fig. 1. To prevent the obstruction of the outlet, I, by the balls, G, and to facilitate draining the liquid product from the balls, an outlet guard, D, Figs. 1 and 2, is fitted to the crushing surface F and the adjacent surfaces within the drum A in the vicinity of the outlet I, and provided with ample openings through which the product may flow into and through the outlet as indicated in Fig. 1. This outlet guard is constructed with a pair of rigid hook-shaped arms, 8, and clamping screws, 9, which interact with the front of the drum to temporarily attach the outlet guard, as in Figs. 1 and 2. It will be understood that the front guard E is removed when the outlet guard D is to be used. The outlet guard is then fastened in place, with the outlet I in its uppermost position or at a distance from the discharging position in which it is shown in Figs. 1 and 2. The drum is then turned so as to bring the outlet I into such discharging position, and the outlet I is then opened for the discharge of the liquid product; the outlet guard D supporting the balls G away from the outlet as indicated in Figs. 1 and 2.

Having thus described said improvement I claim as my invention and desire to patent under this specification:

1. A machine for making chocolate having, in combination, a drum constructed with a circumferential crushing surface within its perimeter and with a concentric circular opening in its front, means for rotating said drum without obstructing its open front, an equipment of suitable balls to interact with said surface, a front guard projecting into the upper portion of said front opening to prevent the chocolate from falling out when the drum is in motion without obstructing the lower portion of said opening, and an independent support for said guard external to the drum.

2. A machine for making chocolate having, in combination, an open-front drum constructed with a circumferential crushing surface within its perimeter and a normally closed outlet for the liquid product adapted to be located at the bottom of the drum by turning the latter, an equipment of balls to interact with said crushing surface, and a removable outlet guard fitted to the inner surfaces of the drum at and adjacent to said outlet, and provided with means for fastening it in place preliminary to turning the drum into its discharging position, in which position said guard supports said balls out of contact with said surfaces at the outlet and facilitates the escape of the liquid product through said outlet, substantially as hereinbefore specified.

In witness whereof I have hereunto set my hand in the presence of two witnesses.

WYCLIFFE EUSTACE MURRAY.

Witnesses:
 E. F. B. PALMER,
 H. D. JAMESON.